United States Patent [19]
Bardot

[11] 3,965,823
[45] June 29, 1976

[54] CONVEYORS
[75] Inventor: Pierre Bardot, Paris, France
[73] Assignee: Sucmanu, Paris, France
[22] Filed: Nov. 5, 1974
[21] Appl. No.: 521,211

Related U.S. Application Data
[63] Continuation of Ser. No. 248,170, April 27, 1972, abandoned.

[30] Foreign Application Priority Data
June 30, 1971 France .............................. 71.23922

[52] U.S. Cl. .................................. 104/91; 104/94; 104/106; 104/130
[51] Int. Cl.² ..................... B61B 3/00; E01B 25/26
[58] Field of Search ............... 104/89, 91, 94–96, 104/104–106, 130; 105/154, 155; 151/41.76

[56] References Cited
UNITED STATES PATENTS

| | | | |
|---|---|---|---|
| 1,876,904 | 9/1932 | Francis | 104/94 |
| 2,688,936 | 9/1954 | Brooks | 104/94 X |
| 3,039,401 | 6/1962 | Bishop | 104/94 X |
| 3,095,672 | 7/1963 | Di Tullio et al. | 151/41.76 X |
| 3,556,570 | 1/1971 | Cosenza | 151/41.76 X |

Primary Examiner—Richard A. Schacher
Assistant Examiner—Andres Kashnikow
Attorney, Agent, or Firm—William A. Drucker

[57] ABSTRACT

This invention provides a conveyer comprising overhead rails mounted on pendant supports, and a load carrying device running on the rails. The supports each have a pair of downwardly extending arms which carry bolts that are fixed to the rails. Each rail has a groove opening on the side opposite to the guiding surface. Each pair of arms has inwardly projecting horizontal extensions at their lower ends. Each rail has at least three horizontal limbs and a vertical limb, the first limb having its upper surface serving as a bearing surface for the load carrying device and its lower surface bearing on an extension of one of the arms; the other horizontal limbs carrying flanges to contain T-shaped heads on the bolts which can be inserted at right angles to the length of the rails.

7 Claims, 10 Drawing Figures

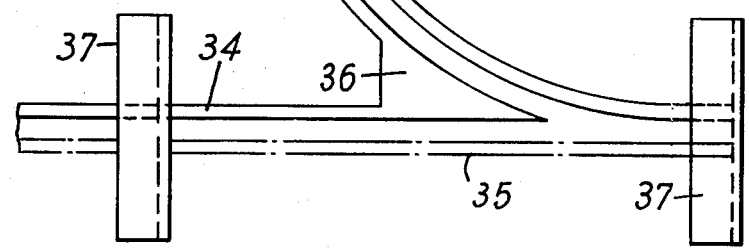
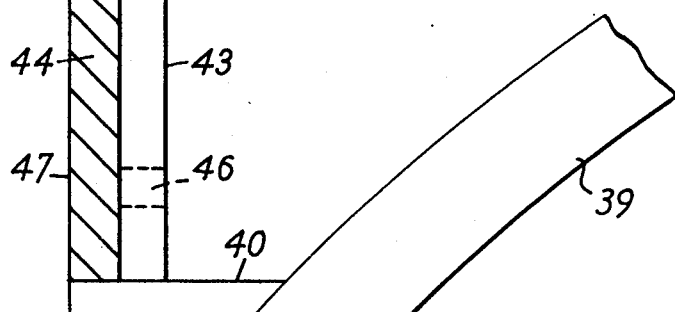
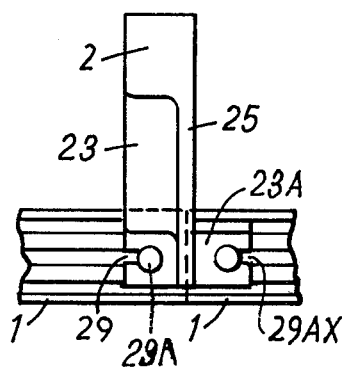

CONVEYORS

This application is a Continuation of application Ser. No. 248,170 filed Apr. 27, 1972, now abandoned.

It is known to provide a conveyor comprising overhead rails mounted on pendant supports and a load carrying device running on the rails, the supports carrying bolts having their heads on the outside surfaces of the arms and their threaded inner ends carrying U-section nuts located within the rails, the rails having upper bearing surfaces and vertical guiding surfaces and being rectangular section tubes with slots facing outwards away from each other. However this construction does not solve the problem of simple fixing. The tubular rails have to be large to carry heavy loads and therefore the U-section nuts have to be large and since a large number of these are required this represents considerable cost, storage space and weight, the latter being undesirable for a workman operating on a ladder near the ceiling. Moreover, the workman has to locate bolts on the holes in these nuts. These nuts are too large to enter through the slots but must be threaded into the ends of the rails and slid along them. The present invention aims to obviate these difficulties.

SUMMARY OF THE INVENTION

In the construction of the present invention the rails are provided with at least three horizontal limbs and a vertical limb, the first limb having its upper surface serving as a bearing surface for the load carrying device and its lower surface bearing on an extension of one of the arms, the other horizontal limbs carrying flanges to contain T-shaped heads on the bolts which can be inserted at right angles to the length of the rails.

BACKGROUND OF THE INVENTION

The present invention relates to a double-rail conveyer comprising bearing and guiding rails carried by supports affixed to frame parts, the said rails being either straight or curved, and means such as switch points and fish plates securing the rails in relation to one another, and at least one load carrier device or truck fitted with bearing elements and guide elements (e.g. rollers) running on the rails.

The object of the present invention is to facilitate maximum work at the factory with minimum erection work on site.

The invention will be explained and understood more clearly by reference to the explanations and drawings provided hereinafter as an example.

FIG. 8 is a view, from above, of an example of a switch point;

FIG. 9 is a view, from above, of a point element of a switch point; and FIG. 10 shows a detail to be described.

Figure 1:
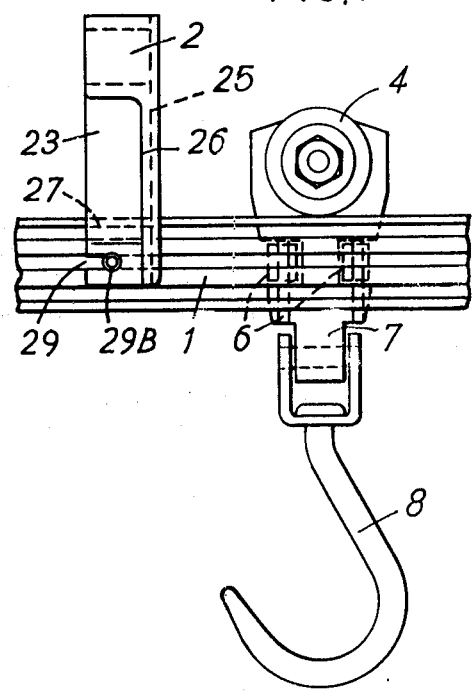
FIG. 1 is a side view of a portion of the conveyor.
Figure 2:
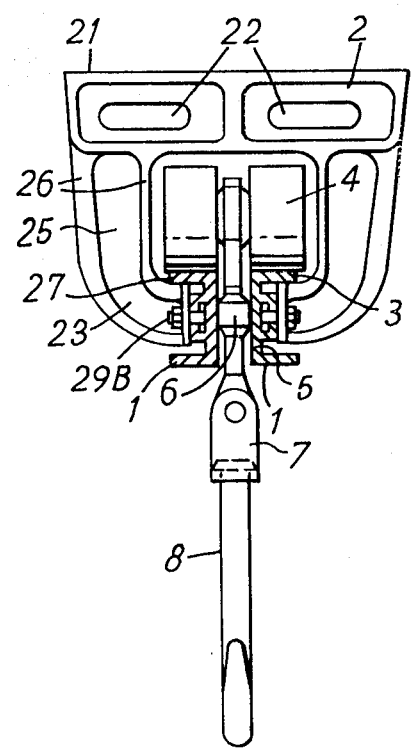
FIG. 2 is an end view corresponding to FIG. 1.

The double-rail handling system to which the invention relates and of which a part is shown in FIGS. 1 and 2 comprises bearing and guiding rail elements or girders 1 kept parallel to one another and at a certain distance by supports 2 affixed to frame parts (not shown in the drawing) generally consisting of I-shaped girders. The elements 1 have a horizontal part 3 serving as a bearing surface on which the bearing rollers 4 rest and a vertical part 5 having a guiding surface 5A against which one or more guide rollers 6 abut, the bearing rollers and guide rollers forming part of a load carrier or truck 7 equipped in the present example with a hook 8.

Figure 3:
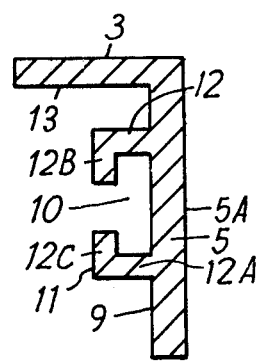
FIGS. 3 and 4 are examples of profiles of running elements and guiding elements, comprising examples of groove profiles.
Figure 4:
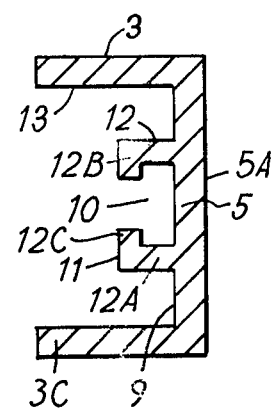

The rails 1, shown in section in FIGS. 3 and 4, comprise a vertical limb 5 having a vertical roller bearing surface 5A and an inner surface 9 and a horizontal limb 3 at the upper end of the vertical limb and at right angles to it. Two other horizontal limbs 12, 12A are fixed to the vertical limb 5 and project from the surface 9 to provide a groove 10 terminating on and opening into the rear face 11 of the rail 5. The section of these grooves is such that that part situated near the guiding surface 5A is larger than that situated on the side of the opening at the rear of the limb 5.

As shown in FIG. 3, the section of the groove 10 is shaped like the letter T, of which the transverse member is situated near the guiding surface 5A, the central member being situated on the side of the opening at the rear of the limb 5 and determining the shape of the opening.

The groove is formed by the two limbs or walls 12, 12A narrower than the horizontal limb 3 and spaced from it and spaced apart from each other and having flanges 12B, 12C at their free ends extending from the narrow walls towards each other.

The profile of the element shown in the example in FIG. 3 has the advantage of providing the greatest possible reduction in weight, while still capable of being efficiently supported by chairs described hereinafter, according to one feature of the invention.

FIG. 4 is a preferred example in which the main profile of the rail is U-shaped i.e., it has a second horizontal limb 3C at the lower end spaced from the limb 12A. This profile, being symmetrical, offers great advantages as regards its rigidity and the possibility of obtaining undifferentiated curved elements, i.e., curved elements which can be used either for a right-hand turn or for a left-hand turn, by being simply turned round.

Figure 5:
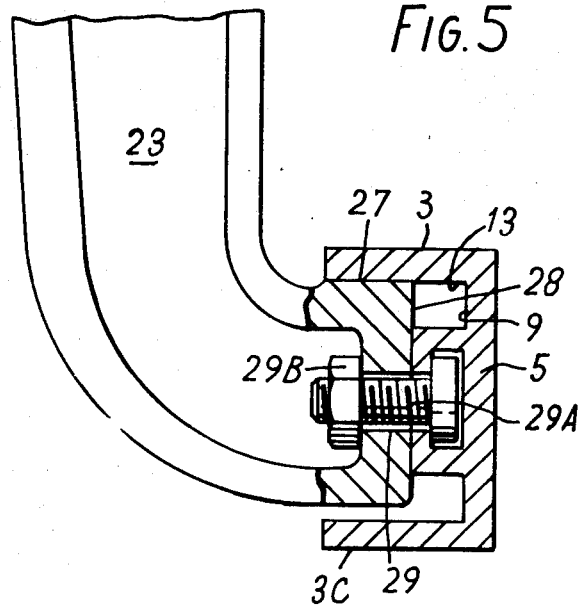
FIG. 5 shows how an element is mounted on the extremity of a supporting arm.

FIG. 2 shows the support 2 by which the rails 1 are secured. This support 2, known as a "chair" comprises a rectilinear part 21 formed with slots 22, both in the vertical planes and in the horizontal planes formed by the faces of the said part 21, which are used for securing purposes, in accordance with the conventional methods. Each of the branches or arms 23, as shown in FIG. 1, comprises a part 25 forming the web of the branch and a rib 26 situated on the periphery of one of the faces of the part 25. The extremities of the branches of the supports, one of which is shown on a larger scale in FIG. 5, extend horizontally towards each other to provide a horizontal face 27 and a vertical face 28, the face 27 interacting with the surface face 13 of the limb 3 and the face 28 rests on the surface of the rail.

The surfaces 27 and 28 extend laterally with respect to the part 23 of the support branch, in planes perpendicular to the plane containing the branches, and on one side only. The lower end of each arm includes a arm or flange 23 which extends in the direction of the length of the rails and is provided with a notch (i.e., a slot open at one end) 29 (FIG. 1). The distance between the axis of this notch and the surface 27 is equal to the distance separating the axis of the opening from the groove on the face 13, so that the limb 3 will be supported on the surface 27 when the bearing and guiding elements are affixed to the support.

The operation of firmly securing the support to the element is carried out by means of a hammer-headed bolt (29A FIG. 5), the head of the bolt being introduced into the groove in the direction of the length of the rail and the notch 29 of the extremity of the support coming to rest on the shank of the bolt, which is then fixed by the aid of a nut 29B.

Figure 6:
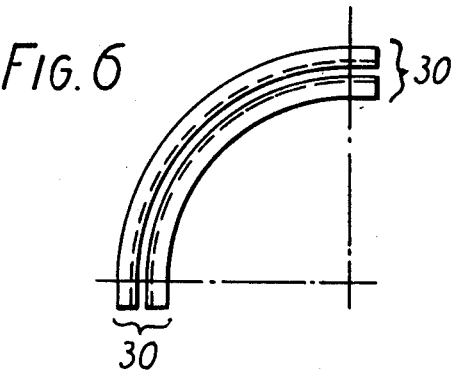
FIGS. 6 and 7 are views, from above, of two examples of curved elements.
Figure 7:
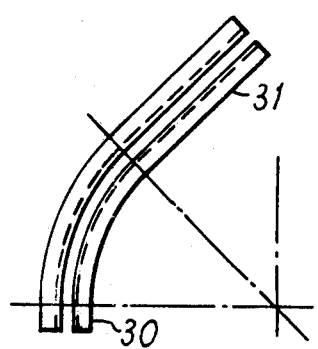

The curved bearing and guiding elements (FIGS. 6 and 7) comprise at the extremity of each exit a short rectilinear portion. FIG. 6 shows a curve of 90°, the axis of the curve being indicated, the exits from the curve being prolonged by rectilinear parts 30. FIG. 7 shows a curve of 45° of which one exit is provided with a short rectilinear part 30, while the other possesses a considerably longer rectilinear part 31. Adjacent ends of rails can be connected together by providing the support 2 with a flange 23A (FIG. 10) which extends in the direction of the length of the adjacent rails on the opposite side of the arm or flange 23 and is symmetrical across the plane of the flat surface of the portion 25. This support is therefore provided with two symmetrical notches 29, 29AX (FIG. 10) on opposite sides of the web 25 so that the joint between the rail elements is situated in the plane of symmetry (i.e., plane of the web 25), the securing means consisting of bolts 29A.

In view of the method by which the elements are secured, a rectilinear part must be provided at the exit from the curves, over a length at least equal to half the thickness of the double support.

FIG. 8 shows an example of a switch point system in which the curved rails 32 and 33 are normal curved rails. The curved rails 33, in conjunction with the rectilinear part 34 forms the switch point 36. The rectilinear track is completed by a rectilinear rail 35. These various elements are secured and assembled to the other elements of the system by double supports 37. The switch point 36 is formed from a curved rail element 39 at the end of which is affixed a part having the shape of a triangular truncated prism 38 (FIG. 9) of which two opposite upper and lower faces are parallel with each other and perpendicular to an end vertical surface or base plane 40, the bearing and guiding surfaces of the curved element 39 being prolonged on two of the perpendicular lateral faces 41 and 42 of the prism, while the other part of the base 40 carries a rectilinear piece 43, of rectangular section and provided with holes 46. The piece 43 is perpendicular to the base 40 and situated at that distance from the nearest lateral face 45 which is required to ensure that the guiding surface, 47 of the end of a rail 44, shall be contiguous with the surface 45 of the part 38. Bolts (not shown) pass through the holes 46 and will enter corresponding holes in the part 44. Also the bearing surface 42 of the prism is continuous with (i.e., in the same plane as) the bearing surfaces of the curved part 39 and the rail 44.

The various elements described above enable tracks to be built up from standard elements. In one example of application use is made of elements of a light alloy section in accordance with FIG. 6 obtained by the profiling method, the approximate dimensions being 50 × 30 mm. From this profile, the curved elements of 90° or 45° are produced at the factory and consist of two separate elements corresponding to the internal and to the external curve respectively; they are assembled on the spot by means of double supports. In view of their moderate weight and the ease with which the profiled unit can be machined the straight elements are cut up on the site.

The device for securing the elements by a slide and hammer-headed bolts does not call for high-precision assembly work and results in a considerable saving of time. The bearing and guiding elements are secured in position by simple supports of the type described.

I claim:

1. In a conveyer comprising two rails, supports holding said rails spaced apart near to each other and parallel to each other, said supports comprising pairs of downwardly extending arms and bolts carried by the lower ends of said arms, which bolts support the rails, each rail having a horizontal bearing surface and a vertical guiding surface, a load carrying device running on the rails in engagement with said bearing surface and said guiding surface, each rail having a groove in that face of the rail on which the guiding surface is formed, said groove extending along the rail, said groove opening at that side of said rail which is remote from the guiding surface, said groove being wider near the guiding surface than at the opening; the improvement which comprises forming each pair of said arms with inwardly projecting horizontal extensions at their lower ends, and forming each rail with at least three horizontal limbs and a vertical limb, said horizontal limbs being spaced apart from each other and connected at one end to the vertical limb; the first of said horizontal limbs having its upper surface serving as said bearing surface and its underneath surface seating on the horizontal extension of one of said arms, the two other horizontal limbs (12, 12A) being of less depth horizontally than the first horizontal limb, a flange (12B, 12C) on the free end of each of said other horizontal limbs, said flanges extending towards each other so that said other horizontal limbs and said flanges form said groove; said bolts having approximately T-shaped heads engaged in the grooves, said T-shaped heads having a width less than the width of the grooves and a length greater than the width of the grooves, said bolts having nuts thereon engaging the lower ends of said arms.

2. A conveyer as claimed in claim 1 wherein the bolts are carried by flanges (27) on the lower ends of said arms, said flanges extending from said lower ends in the direction of the length of the rails; said flanges having notches (29) in which said bolts are located; said lower ends of the arms having vertical surfaces (28) abutting against said flanges (12B, 12C) on the free ends of said horizontal limbs.

3. A conveyer as claimed in claim 1 wherein a fourth horizontal limb is located at the lower end of the vertical limb extending from the vertical limb in the same direction as the other horizontal limbs and of approximately the same horizontal width as the first horizontal limb.

4. A conveyor as claimed in claim 1 having a switch point comprising a pointed element including a curved rail of the form claimed in claim 1 to one end of which is cast a part in the form of a triangular truncated prism of which the top and bottom faces are parallel to each other and perpendicular to an end vertical surface, said part also having a plane vertical surface at right angles to the end vertical surface and a vertical curved surface forming a point with said plane vertical surface, and a recilinear part carried on the end surface of said part and located at such distance from the adjacent vertical face of the prism as to receive an end of another rail to ensure that the horizontal and vertical guiding and bearing surfaces of the last mentioned rail are continuous with the corresponding surfaces of the prism part; the horizontal and vertical surfaces of the curved rail being also continuous with the corresponding surfaces of the prism part.

5. A conveyer as claimed in claim 1 having each arm of one pair of arms provided at its lower end with flanges which extend on both sides of the depending arm and has bolt-receiving notches in said flanges on opposite sides of the depending arms and thereby attached to adjacent ends of rails meeting in the plane of said depending arms.

6. A conveyer comprising two rails, supports holding said rails spaced apart near to each other and parallel to each other, each rail having a bearing surface and a guiding surface, the guiding surface being at right angles to the bearing surface, a load carrying device running on the rails in engagement with said bearing surfaces and said guiding surfaces, each rail having a groove in that face of the rail on which the guiding surface is formed, said groove extending along the rail, said groove opening at that side of said rail which is remote from the guiding surface, said groove being wider near the guiding surface than at the opening, each rail comprising a vertical limb providing a vertical roller guiding surface, a horizontal limb at the free upper end of the vertical limb at right angles thereto extending away from said vertical limb, two further horizontal limbs attached to the vertical limb and spaced from the limb and spaced apart from each other and of less depth horizontally than the horizontal limb, a flange at the end of each free end of said further limbs, said flanges extending towards each other from the further limbs, said further limbs and flanges thus forming said groove, said groove being of approximately T-shaped cross-section; bolts carried by said supports, said bolts having T-shaped heads the width of which is less than the width of said groove and the length of which is greater than said width, said bolts being located in said groove; said horizontal limb having a greater width than said further limbs each of said supports including two depending supporting arms for carrying the rails respectively, said arms having horizontal extensions at their lower ends which are overlapped by said horizontal limb; and a switch point comprising a pointed element including a curved rail to one end of which is cast a part in the form of a triangular truncated prism of which the top and bottom faces are parallel to each other and perpendicular to an end vertical surface, said part also having a plane vertical surface at right angles to the end vertical surface and a vertical curved surface forming a point with said plane vertical surface, and a rectilinear part carried on the end surface of said part and located at such distance from the adjacent vertical face of the prism as to receive an end of another rail to ensure that the horizontal and vertical guidling and bearing surfaces of the last mentioned rail are continuous with the corresponding surfaces of the prism part; the horizontal and vertical surfaces of the curved rail being also continuous with the corresponding surfaces of the prism part.

7. A conveyer comprising two rails, supports holding said rails spaced apart near to each other and parallel to each other, each rail having a horizontal bearing surface (3) and a vertical quiding surface (5A), a load carrying device (4-8) running on the rails in engagement with said bearing surface (3) and said guiding surface (5A), each rail having a groove (10) in that face of the rail on which the guiding surface is formed, said groove extending along the rail, said groove opening at that side of said rail which is remote from the guiding surface, said groove being wider near the guiding surface than at the opening, each rail comprising a vertical limb (5) providing the vertical roller guiding surface (5A), a horizontal limb (3) at the free upper end of the vertical limb at right angles thereto extending away from said vertical limb, two further horizontal limbs (12, 12A) attached to the vertical limb and spaced from the limb and spaced apart from each other and of less depth horizontally than the horizontal limb, a flange (12B, 12C) at the end of each free end of said further limbs, said flanges extending towards each other from the further limbs (12, 12A), said further limbs and flanges thus forming said groove (10), said groove being of approximately T-shaped cross-section; bolts (29A) carried by said supports, said bolts having T-shaped heads the width of which is less than width of said groove and the length of which is greater than said width said bolts being located in said groove; each of said supports (2) including two depending supporting arms (23) for carrying the rails respectively, said arms having horizontal extensions at their lower ends which are overlapped by said horizontal limb (3), each of said supporting arms having an upper horizontal surface (13) on which said horizontal limb sits; said horizontal extensions having vertical end faces (28) abutting against said flanges (12B, 12C); the lower ends of said arms being in the form of plates having notches (29), the distance of said notches from the upper surfaces (27) of said horizontal extensions being such that the said upper surfaces (27) directly engage the under surfaces (13) of said horizontal limbs (3) to support the rails.

* * * * *